(12) United States Patent
Wang et al.

(10) Patent No.: US 7,043,899 B2
(45) Date of Patent: May 16, 2006

(54) ON-LINE CATALYST MONITORING USING A KALMAN FILTER

(75) Inventors: Wei Wang, Troy, MI (US); Anson Lee, St. Clair, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 56 days.

(21) Appl. No.: 10/854,373

(22) Filed: May 26, 2004

(65) Prior Publication Data

US 2005/0267669 A1    Dec. 1, 2005

(51) Int. Cl.
*F01N 3/00*    (2006.01)

(52) U.S. Cl. .............................. 60/277; 60/274; 60/285; 701/109; 701/115; 703/8

(58) Field of Classification Search ................. 60/274, 60/276, 285, 277; 701/103, 109, 115; 703/7, 703/8
See application file for complete search history.

(56) References Cited

U.S. PATENT DOCUMENTS

| | | | |
|---|---|---|---|
| 5,535,135 A * | 7/1996 | Bush et al. .................... 702/24 |
| 5,625,750 A | 4/1997 | Puskorius et al. |
| 5,758,490 A * | 6/1998 | Maki et al. .................... 60/274 |
| 5,847,271 A | 12/1998 | Poublon et al. |
| 5,901,552 A * | 5/1999 | Schnaibel et al. ............. 60/274 |
| 5,945,597 A | 8/1999 | Poublon et al. |
| 6,006,153 A | 12/1999 | Stander et al. |
| 6,035,632 A | 3/2000 | Stander et al. |
| 6,336,084 B1 * | 1/2002 | Omara et al. .................. 60/274 |
| 6,782,695 B1 * | 8/2004 | Lutz et al. ...................... 60/285 |
| 6,840,036 B1 * | 1/2005 | Fiengo et al. .................. 60/285 |

OTHER PUBLICATIONS

A Review of the Dual EGO Sensor Method for OBD-II Catalyst Efficiency Monitoring, Jeffery S. Hepburn, et al., SAE 942057, pp. 1-44, Oct. 17-20, 1994.
Stochastic models, estimation, and control, Chapter 1, Introduction, Peter S. Maybeck, Academic Press, Inc. 1979, vol. 1, pp. 1-16.

* cited by examiner

*Primary Examiner*—Binh Q. Tran
(74) *Attorney, Agent, or Firm*—Ralph E. Smith

(57) ABSTRACT

A method of non-intrusive monitoring of catalyst performance in an automotive exhaust system uses a model of catalytic converter operation emphasizing oxygen storage capacity dominance. Model parameters are identified using a recursive Kalman filtering technique. A catalyst diagnostic index is derived from at least one identified parameter, and the index is used to judge converter performance.

10 Claims, 3 Drawing Sheets

ON-LINE CATALYST MONITORING USING A KALMAN FILTER

FIELD OF THE INVENTION

The present invention relates to monitoring a catalyst in a motor vehicle, and in particular, to a method for unintrusively detecting an unacceptably aged catalyst.

BACKGROUND OF THE INVENTION

Catalytic converters are devices used to reduce pollutants from motor vehicle exhaust gases. Catalysts promote chemical reactions that convert pollutants such as carbon monoxide (CO), hydrocarbons (HC), and oxides of nitrogen ($NO_x$) into carbon dioxide, water and nitrogen.

Known methods for catalyst monitoring include monitoring based on direct HC or $NO_x$ sensor measurement, monitoring based on temperature measurement, and monitoring based on the converter's oxygen storage capacity with dual oxygen sensors placed upstream and downstream of the converter. Currently available HC and $NO_x$ sensors are expensive and less stable than other available sensors, such as oxygen sensors or thermocouples.

To date, temperature measurement approaches are prone to noise sources, such as ambient temperature and wind conditions. Furthermore, different starting up processes by different drivers or the same driver at different occasions will force the engine to run in different patterns which, in turn, will significantly change the time history of the exhaust gas temperature and flow rate.

Unacceptable aging of a catalyst may be detected based on oxygen storage capacity by first biasing the oxygen level in the exhaust system to a rich or lean amount. Counts of rich/lean and lean/rich transitions of upstream and downstream oxygen sensors are accumulated, and a ratio of the counts is then used in a so-called frequency ratio test to determine the amount of untreated exhaust gas breaking through the catalyst. While this method is generally effective, it suffers drawbacks of being intrusive to the engine fueling control system and thereby increasing pollutant emissions during execution of the method of monitoring. Since pollutant emissions are increased while this method executes, execution time must be minimized, often leading to incorrect monitoring results. Additionally, the oxygen storage capacity monitoring approach is prone to noise disturbances.

In a copending, commonly assigned U.S. patent application Ser. No. 10/348,553, filed Jan. 21, 2003, an unintrusive catalyst monitoring method is described. This method generates a catalyst performance index based on behavior of both upstream and downstream oxygen sensors placed at the catalyst input and output, but without looking into the catalyst's internal characteristics.

Therefore, there is a need for an unintrusive catalyst monitoring approach using modeling of the dynamic behavior of the catalytic converter for improved, noise-resistant detection of an unacceptably aged catalyst.

SUMMARY OF THE INVENTION

Accordingly, a method of on-line, non-intrusive monitoring of a catalytic converter uses an oxygen storage dominant model to model dynamic behavior of a catalytic converter. Parameters of the model are identified using a recursive Kalman filtering technique and a catalyst diagnostic index is derived from a preselected parameter of the model. The index is used to judge performance of the catalytic converter.

BRIEF DESCRIPTION OF THE DRAWING

The objects and features of the invention will become apparent from a reading of a detailed description, taken in conjunction with the drawing, in which.

DETAILED DESCRIPTION

Figure 1:
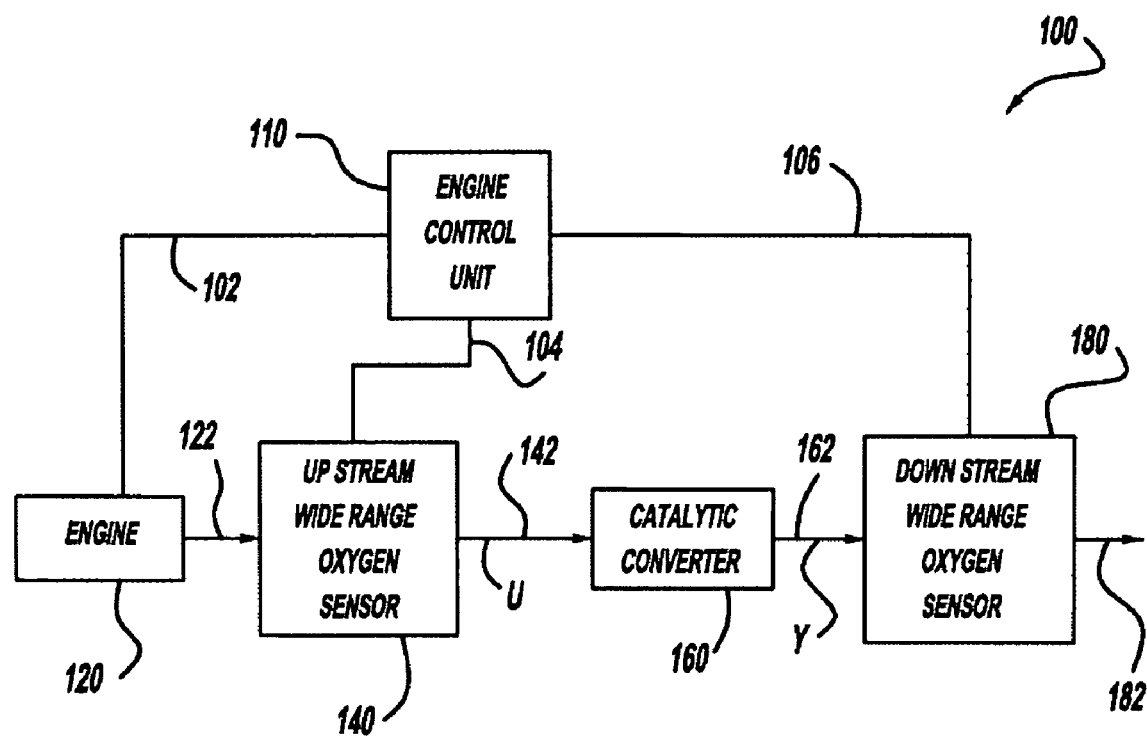
FIG. 1 is a block diagram showing the components of an exhaust catalyst monitoring system arranged in accordance with the principles of the invention.

FIG. 1 illustrates an exhaust catalyst monitoring arrangement 100 having an engine control unit (ECU) 110, a motor vehicle engine 120, a catalytic converter 160 having a catalyst to be diagnosed, an upstream wide range oxygen sensor 140 and a downstream wide range oxygen sensor 180. Upstream oxygen sensor 140 monitors the level of oxygen in exhaust gases produced by motor vehicle engine 120 and present at input 142 of catalytic converter 160. Downstream wide range oxygen sensor 180 monitors the level of oxygen in the exhaust gases flowing from an output 162 of catalytic converter 160. ECU 110 controls engine 120 to operate about a stoichiometric fuel/air ratio operating point using buses 102, 104 and 106, and ECU 110 executes a non-intrusive, stored program method for detecting an unacceptably aged catalyst as described herein.

Looking from a system point of view, a catalytic converter may be treated as a nonlinear plant in which chemical reactions, thermotransferring and exhaust flow dynamics are coupled together. An aging factor will also greatly affect the converter's operation in the long run. However, with enough simplifications, it is possible to capture the main part of catalyst dynamics such that the converter's performance may be estimated, and a diagnostics index can be generated. The underlying approach is to model the dynamic behavior of a degraded catalyst and determine its key parameters, such as a time constant. An aged catalyst close to failure will first be tested and its parameters will be identified. These parameters will be used as benchmarks for catalyst monitoring. Parameters for other catalysts obtained from the same model building process will be compared with the benchmark catalyst, and then judgment can be made on degradation levels of these catalysts.

Storage dominated modeling captures the dominating dynamics of the catalyst. Based on many experimental observations, it has been found that all the measured gas components (HC, CO and $NO_x$) respond to upstream air/fuel ratio changes over a similar time scale. This suggests that the chemical reaction process is dominated by relatively slow dynamics of a single process, such as oxygen storage and release to/from the catalyst surface, and that the other kinetics such as the reduction of $NO_x$ and the oxidation of CO and HC occur over a much shorter and less significant time scale. With this understanding, it is possible that a simple nonlinear dynamic model will be sufficient for capturing the main storage dynamics of the converter and no complex coupled dynamic equations should be needed. The final output of the model is the effective air/fuel ratio after the absorption/desorption process. In order to determine the exact conversion efficiency for a given species, a conventional static mapping from the effective air/fuel ratio to the conversion efficiency and tailpipe gas concentrations is sufficient. In this method, two wide range exhaust oxygen sensors 140 and 180 of FIG. 1 are placed upstream and downstream relative to the converter being diagnosed.

When the catalyst is aged, its capacity for storing oxygen while the engine is running lean will be reduced, and its speed of storing the oxygen will also be reduced. This will be shown in the delayed and low-pass response of the downstream wide range oxygen sensor signal. On the other hand, the on-line diagnostics require the monitoring algorithm to be very efficient and the simplified storage dominated model has this advantage. In the following, the use of a simplified oxygen storage model in monitoring performance of the catalyst will be demonstrated. To make the algorithm computationally less demanding, the recursive Kalman filter will be used to perform the on-line parameter estimation.

The following assumptions are made to simplify the catalyst monitor modeling process:
a) The exhaust gas mass flow rate is a constant during the test. This makes the monitoring model only suitable for steady state operation which is enough for catalyst monitoring. The flow rate fluctuation will be treated as noise in the model.
b) Catalyst temperature does not change during the test. The effective temperature to the catalyst oxygen storage is ignored in the model. When the test is run in a short time, the catalyst temperature should not change significantly.

Based on experience with the catalyst, the following Auto Regressive Moving Average (ARMA) model was selected to represent the fundamental dynamic behavior of a catalyst:

$$y(k)=a_1y(k-1)+b_1u(k-1)+b_2u(k-2)+\ldots+b_nu(k-n)+v(k) \quad (1)$$

where
u represents the upstream relative equivalent air/fuel ratio which is input to the system or catalyst;
y represents the downstream relative equivalent air/fuel ratio which is the output from the system;
$a_1$ and $b_1, b_2, \ldots, b_n$ are the coefficients of the model;
k is the discrete time step;
n represents the time delay step for the input; and
v is the measurement noise.

Relative equivalent air/fuel ratio is the actual equivalent air/fuel ratio minus equivalent stoichoimetric air/fuel ratio.

When exhaust gas enters the catalyst via path 142 of FIG. 1, its oxygen level can be represented by the relative air/fuel ratio u. Depending on the catalyst's original oxygen storing status and consecutive input signals u, the output (downstream) signal y at converter output 162 can be obtained using the above difference equation (1). In the lean case, the catalyst is thought to absorb oxygen. In reality, a three-way catalyst stores more than just oxygen. However, for simplicity, this model combines the effect of the overall reactant storage into a single oxygen storage model. For the rich case, there is very little oxygen in the inlet 142 exhaust gas to the catalyst, and the equivalent air/fuel ratio does not show proportionality to the oxygen concentration. On the other hand, it is true that the equivalent air/fuel ratio is proportional to the carbon monoxide concentration in the exhaust, and carbon monoxide is one major component which consumes the stored oxygen in the catalyst. Practically, the CO concentration can be treated as the negative oxygen concentration numerically with a mole fraction correction coefficient. This treatment will ensure the model uniformly handles both the lean and rich cases.

Only the first order output dynamics is shown in equation (1)—i.e., only one a term. This is done, because the dominant low-pass filtering effect is needed to quantify the aging effect of the catalyst from the viewpoint of catalyst monitoring. Considering gas transfer delay and the blending effect of inlet gas inside the catalyst, an $n^{th}$ order input dynamics has been incorporated into the model. It can be shown that usually the $4^{th}$ or $5^{th}$ order will be enough—i.e., n=4 or 5—depending on the exhaust gas flow rate. Most importantly, the magnitude of $a_1$ represents the conversion rate of a catalyst. In fact, $a_1$ is the dominant pole of the system. When $a_1$ is small, the catalyst under test has a fast conversion rate, and the quality of the catalyst should still be acceptable. If $a_1$ is very close to 1, the catalyst has a slow conversion rate. It will take more time for the output of the system (relative downstream equivalent air/fuel ratio) to return to its neutral position of 0. This means that more exhaust gas breakthrough has been caused, and the catalyst could become unacceptable. As a result, the determination of $a_1$ becomes the key index in catalyst monitoring for this invention.

To determine $a_1$, all other parameters need identification at the same time. This comprises a standard parameter identification problem.

First, equation (1) can be rewritten as:

$$y(k) = [y(k-1)u(k-1) \ldots u(k-n)]\begin{bmatrix} a_1(k) \\ b_1(k) \\ \vdots \\ b_n(k) \end{bmatrix} + v(k) \quad (2)$$

$$y(k) = H(k)X(k) + v(k) \quad (3)$$

where $$H(k) = [y(k-1)u(k-1) \ldots u(k-n)] \text{ and}$$

$$X(k) = \begin{bmatrix} a_1(k) \\ b_1(k) \\ \vdots \\ b_n(k) \end{bmatrix}$$

Note that X(k) contains all the parameters to be identified, and H(k) holds the input and output values prior to step k. X(k) will evolve in the estimation process based on the following equation:

$$X(k+1)=FX(k)+BU(k)+Gw(k) \quad (4)$$

where
F is an identity matrix of dimension n+1;
BU(k) is the assumed input term, and, in fact, B is a zero vector of dimension n+1;
Gw(k) is the noise term, and G can be assumed to be a comparable identify matrix.

The Kalman filter attempts to minimize the difference between a real and an estimated value of X. Let the estimated value of X be designated as $\hat{X}$. Then the standard one-step predicting form of the Kalman filter for a system specified by equations (3) and (4) is given by:

$$\hat{X}(k+1) = \hat{X}(k) + \overline{w}(k) + K(k)[y(k) - H(k)\hat{X}(k) - \overline{v}(k)] \quad (5)$$

$$K(k) = \frac{\Sigma(k)H(k)^T}{H(k)\Sigma(k)H(k)^T + R} \quad (6)$$

$$\Sigma(k+1) = \Sigma(k) + Q - K(k)H(k)\Sigma(k) \quad (7)$$

where
K(k) is the Kalman gain matrix;
$\Sigma(k)$ is the variance matrix for estimation error, and $\Sigma(k) \underline{\Delta} E\{[X(k)-\hat{X}(k)] [X(k)-\hat{X}(k)]^T\}$, where E is the expected value and T indicates a matrix transpose.
$\overline{w}(k)$ is the mean value of system noise w(k) or $\overline{w}(k)=E[w(k)]$, and if w(k) is assumed to be a zero mean Gaussian white noise, then $\overline{w}(k)=0$;
$\overline{v}(k)$ is the mean value of measurement noise v(k) or $\overline{v}(k)=E[v(k)]$, and it can also be assumed to have zero mean, i.e., $\overline{v}(k)=0$;
Q is the variance matrix of w(k) and $Q=E [w(k)w(k)^T]$;
R is the variance of v(k) and in this case $R=E[v(k)^2]$.

The estimation of X(k) in equations (5)–(7) can be entirely determined by the value of Q,R and the initial values of $\hat{X}(0)$ and $\Sigma(0)$. One might select X(0)=0 and $\Sigma(0)=\alpha \cdot I$ where I is the identify matrix and $\alpha$ is a large positive number. For the purposes of this description, "large" may be defined as $10^5$ or greater, i.e., larger than any other coefficient used in the equations. $\alpha$ is selected on this basis for initialization only, and the exact value selected is unimportant. Q and R can be selected from a simulation study.

When the on-line input and output data (upstream and downstream air/fuel ratio) become available, the Kalman filter (equations (5)–(7) can recursively estimate the system parameter vector X(k). Once the vector X(k) becomes stable as estimation continues, the element $a_1$ in X(k) is what will be used as an index for catalyst monitoring. For the purposes of this description, stability is defined by the absolute value of X(k+1)–X(k) being less than a preselected value. Since X(k) is a vector, one could check $a_1(k)$ of X(k) and stop the recursive estimation process when the absolute value of $a_1(k+1)-a_1(k)$ is less than a predetermined small number $\epsilon$.

The absolute value of $a_1$ will vary between zero and one. $a_1$ is used as an index by picking a target value between zero and one, above which the catalyst will be deemed to have unacceptably aged and therefore is ready for replacement. This target value is heuristically determined by experiment to derive a suitable index value.

Figure 2:
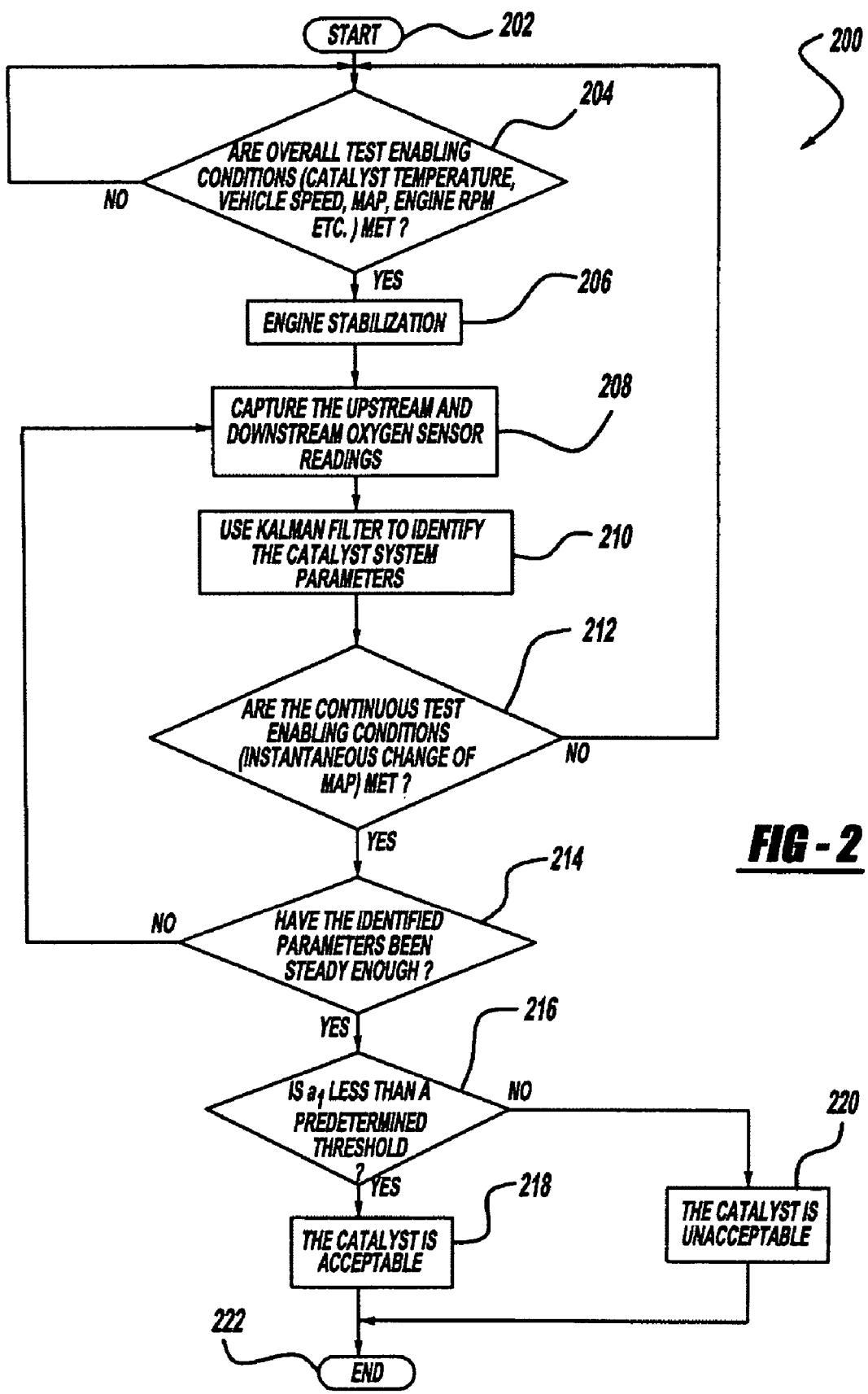
FIG. 2 is a flow chart depicting an embodiment of the monitoring method executed by the system of FIG. 1.

With reference to FIG. 2, a method 200 for detecting an aged catalyst is presented. Method 200 is executed by engine control unit 110 of FIG. 1. However, the method may also be executed by other stored program devices having access to wide range oxygen sensor signals from sensors 140 and 180 of FIG. 1.

Method 200 begins at start block 202 and then a stabilization test is executed at decision block 204 to determine whether engine 120 operating conditions are suitable for enabling detection of an aged catalyst in converter 160 in accordance with the method of this invention. Satisfactory conditions generally include proper catalyst temperature, vehicle speed within a predetermined range, proper manifold absolute pressure, acceptable engine RPM, etc. If enablement conditions are not met in decision block 204, the method loops back and continues checking until the desired enabled conditions are met. Once enabled, the method continues to block 206 where engine stabilization to a steady-state condition is established.

After engine stabilization at 206, the current readings from the upstream and downstream wide range oxygen sensors are taken at block 208. Next, at block 210 a Kalman filter is used to identify the catalyst system model parameters to within a satisfactory tolerance.

At decision block 212, the continuous test enabling conditions are rechecked for proper values. If these conditions are not met at block 212, the method 200 loops back to step 204 for continued testing until enabling conditions are once again met.

If the continuous test enabling conditions are met at decision block 212, then method 200 proceeds to decision block 214 to determine whether the identified parameters have satisfactorily stabilized. As described enough, this stability is determined by taking the absolute value of the difference between $a_1$ at sampling time k and $a_1$ at sampling time k+1 and comparing that to a preselected low ratio value $\epsilon$.

If there is insufficient parameter stability, the routine loops back to step 208 to begin Kalman filter estimation with a new pair of readings from the upstream and downstream oxygen sensors at block 208.

If parameter stability has been realized, then the routine proceeds to decision block 216 where the absolute value of $a_1$ is compared to a predetermined threshold. If $a_1$ is less than the predetermined threshold, this indicates that the catalyst is acceptable at step 218 and the routine ends at step 222. On the other hand, if the absolute value of $a_1$ is not less than the predetermined threshold, then at block 220 the catalyst is deemed unacceptable.

Figure 3:
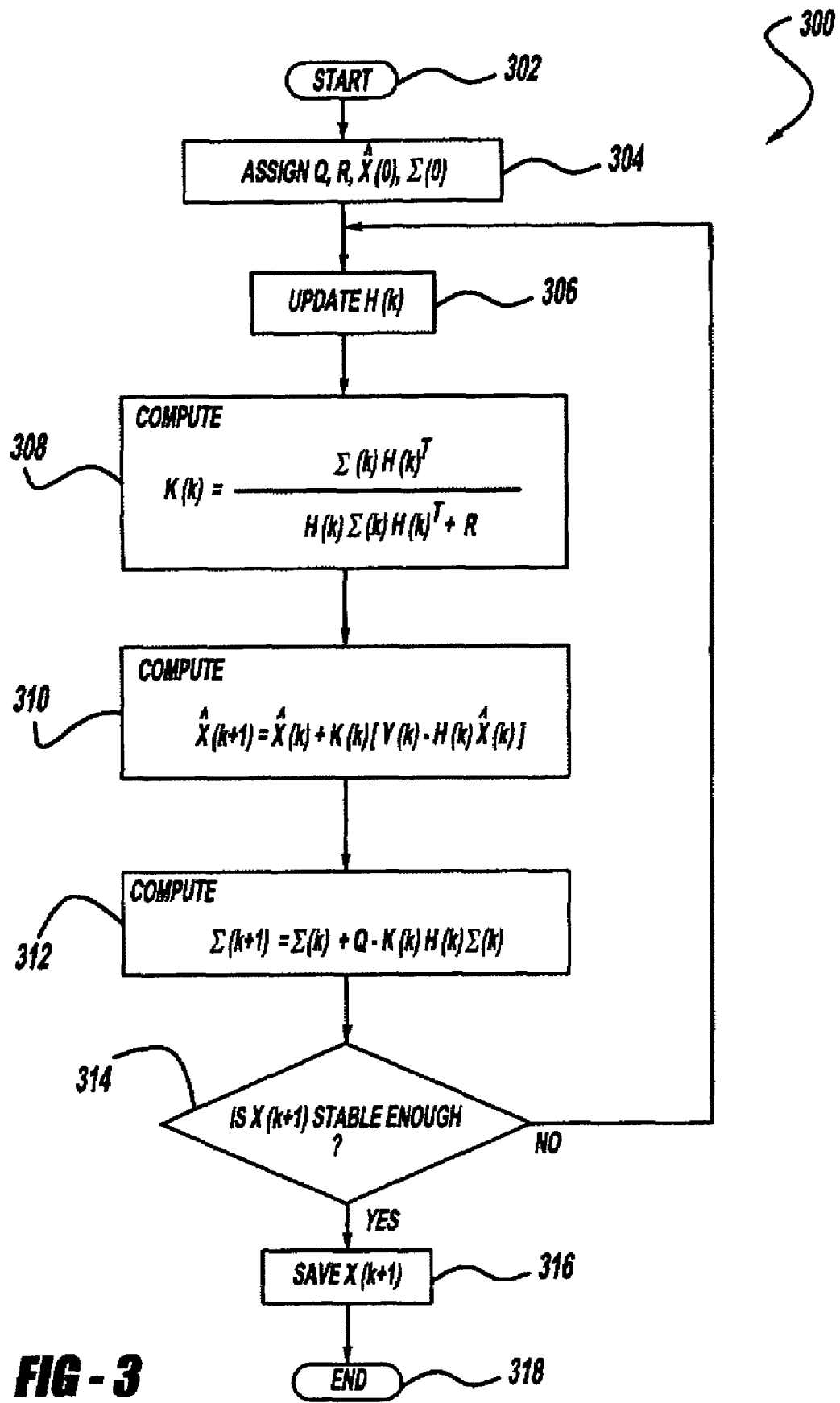
FIG. 3 is a flow chart demonstrating recursive Kalman filtering for determining the parameters of the model of the dynamic behavior of the catalytic converter being diagnosed.

With reference to FIG. 3, Kalman filtering to determine the model parameters is set forth in more detail as method 300.

Method 300 begins at start block 302 and proceeds to block 304 wherein Q,R,$\hat{X}(0)$ and $\Sigma(0)$ are assigned initial values. Routine 30 next proceeds to block 306 where H(k) is updated in accordance with the downstream fuel to air data at step k–1 along with n previous sample values of input u to the converter of FIG. 1.

Next at steps 308, 310 and 312, respectively, equations (5), (6), and (7) are computed.

At decision block 314, the estimated X vector at step k+1 is tested for stability. As set forth above, this step involves the sequential absolute value of changes from one estimation step to the next being so small as to effectively make the estimation vector stable. If the stability is not shown, the routine returns to block 306 where H(k) is once again updated and the computations recursively continue.

After stability has been determined in block 314, the routine saves the estimated value of the X vector for step k+1, and the catalyst is judged acceptable or unacceptable based on the value of the dominant pole of the modeling equation—i.e., $a_1$.

Implementing a catalyst monitor based on a Kalman filter technique has many advantages over other methods, such as strong statistical stability, which, in turn, leads to minimization of estimation variance and improved noise rejection capability. The recursive approach using the Kalman filter can also greatly reduce required computing time, and an unintrusive on-line estimation in accordance with this invention can accurately track gradual catalysts degradation over time.

When a catalyst is new, its efficiency is very high and very little downstream activities can be captured by the downstream wide range oxygen sensor. This is, in fact, easy to diagnose and it is a trivial case of using the Kalman filtering approach. Practically, separate treatment to this trivial case can be adopted. On the other hand, the Kalman filtering approach is much more effective in dealing with catalysts with different severe aging levels.

The invention has been described with respect to an exemplary embodiment which is given for the sake of example only. The scope and spirit of the invention are measured by appropriately interpreted claims appended hereto.

What is claimed is:

1. A method of on-line, non-intrusive monitoring of a catalytic converter, the method comprising:
   modeling dynamic behavior of a catalytic converter using an oxygen storage dominant model;
   identifying parameters in the model using a recursive Kalman filtering technique;
   deriving a catalyst diagnostic index using said model parameters identified by said Kalman filtering technique; and
   using the index to judge performance of the catalytic converter.

2. The method of claim 1 wherein the storage dominant model is described by an auto-regressive moving average equation.

3. The method of claim 2 wherein the preselected parameter comprises a pole of the auto-regressive moving average equation.

4. The method of claim 3 wherein the pole is directly related to a catalyst conversion rate.

5. The method of claim 3 wherein the pole comprises a dominant pole of the equation.

6. The method of claim 1 wherein the performance of the catalytic converter is judged acceptable whenever the index is less than a predetermined threshold value.

7. The method of claim 2 wherein the equation is $$y(k)=a_1 y(k-1)+b_1 u(k-1)+b_2 u(k-2)+\ldots +b_n u(k-n)+v(k)$$

where
   u represents the upstream relative equivalent air/fuel ratio which is input to the system or catalyst;
   y represents the downstream relative equivalent air/fuel ratio which is the output from the system;
   $a_1$ and $b_1, b_2, \ldots, b_n$ are the coefficients of the model;
   k is the discrete time step;
   n represents the time delay step for the input; and
   v is the measurement noise.

8. The method of claim 7 wherein the preselected parameter is $a_1$, and the index is derived by taking the absolute value of $a_1$.

9. The method of claim 7 wherein the absolute value of $a_1$ ranges in value from zero to one and wherein the performance of the catalytic converter is judged acceptable whenever the absolute value of $a_1$ is less than an experimentally determined threshold value between zero and one.

10. The method of claim 1, wherein said using an oxygen storage dominant model includes using a linear model.

* * * * *